(12) United States Patent
Roberge

(10) Patent No.: US 10,612,462 B2
(45) Date of Patent: Apr. 7, 2020

(54) TURBOMACHINERY WITH HIGH RELATIVE VELOCITY

(71) Applicant: United Technologies Corporation, Farmington, CT (US)

(72) Inventor: Gary D. Roberge, Tolland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 688 days.

(21) Appl. No.: 15/103,833

(22) PCT Filed: Dec. 12, 2014

(86) PCT No.: PCT/US2014/070089
§ 371 (c)(1),
(2) Date: Jun. 10, 2016

(87) PCT Pub. No.: WO2015/130386
PCT Pub. Date: Sep. 3, 2015

(65) Prior Publication Data
US 2016/0298539 A1  Oct. 13, 2016

Related U.S. Application Data

(60) Provisional application No. 61/915,086, filed on Dec. 12, 2013.

(51) Int. Cl.
*F02C 1/00* (2006.01)
*F02C 3/067* (2006.01)
*F02K 3/072* (2006.01)
*F02C 3/107* (2006.01)

(52) U.S. Cl.
CPC .............. *F02C 3/067* (2013.01); *F02C 3/107* (2013.01); *F02K 3/072* (2013.01); *F05D 2260/40311* (2013.01); *Y02T 50/671* (2013.01)

(58) Field of Classification Search
CPC .. F02K 3/072; F05D 2260/40311; F01D 1/24; F01D 1/26; F02C 3/067; F02C 3/107; F02C 3/113; F02C 3/36; F02C 7/36
See application file for complete search history.

(56) References Cited

U.S. PATENT DOCUMENTS 3,363,419 A * 1/1968 Wilde ...................... F02K 3/062
  415/119
3,448,582 A * 6/1969 Bracey ...................... F02K 3/04
  415/91
3,673,802 A * 7/1972 Krebs ...................... F02C 3/067
  415/79

(Continued)

OTHER PUBLICATIONS

Gunston, Bill; Pratt & Whitney PW8000; Mar. 2010; Jane's Aero-Engines; Issue 27.*

(Continued)

*Primary Examiner* — Craig Kim
*Assistant Examiner* — Edwin Kang
(74) *Attorney, Agent, or Firm* — Cantor Colburn LLP

(57) ABSTRACT

The present disclosure relates generally to turbomachinery in which a rotating component is disposed adjacent a counter-rotating component in order to achieve a relative rotational velocity that is higher than would be achieved with a rotating component disposed adjacent to a stationary component.

4 Claims, 6 Drawing Sheets

(56) References Cited

U.S. PATENT DOCUMENTS

| | | | | |
|---|---|---|---|---|
| 3,861,139 | A * | 1/1975 | Jones | F02C 3/067 60/226.1 |
| 4,790,133 | A * | 12/1988 | Stuart | F02C 3/067 415/65 |
| 4,809,498 | A * | 3/1989 | Giffin | B64C 11/48 416/129 |
| 5,010,729 | A * | 4/1991 | Adamson | F02C 3/067 416/129 |
| 2006/0093464 | A1 * | 5/2006 | Moniz | F01D 25/16 415/68 |
| 2006/0093467 | A1 | 5/2006 | Orlando et al. | |
| 2008/0148707 | A1 * | 6/2008 | Schilling | F02C 3/067 60/39.162 |
| 2010/0155526 | A1 | 6/2010 | Negulescu | |
| 2010/0223904 | A1 * | 9/2010 | Edwards | F02C 3/067 60/224 |
| 2010/0301617 | A1 | 12/2010 | Lundbladh | |
| 2010/0326050 | A1 | 12/2010 | Schilling et al. | |
| 2013/0000322 | A1 | 1/2013 | Silkowski | |
| 2013/0192201 | A1 | 8/2013 | Kupratis et al. | |

OTHER PUBLICATIONS

"Full Scale Technology Demonstration of a Modern Counterrotating Unducted Fan Engine Concept"; Dec. 1987; NASA—Lewis Research Center; Contract NAS3-24210; http://ntrs.nasa.gov/archive/nasa/casi.ntrs.nasa.gov/19900000732_19900000732.pdf; 3 pgs. including pp. 3 and 48.

International Search Report for International Application No. PCT/US2014/070089; International filing date: Dec. 12, 2014; dated Sep. 11, 2015; 4 pgs.

International Written Opinion for International Application No. PCT/US2014/070089; International Filing Date: Dec. 12, 2014; dated Sep. 11, 2015; 10 pgs.

* cited by examiner

TURBOMACHINERY WITH HIGH RELATIVE VELOCITY

CROSS REFERENCE TO RELATED APPLICATION

This application is a National Phase of Patent Application PCT/2014/070089 filed on Dec. 12, 2014 incorporated by reference herein and claims the benefit of and incorporates by reference herein the disclosure of U.S. Ser. No. 61/915,086 filed Dec. 12, 2013.

TECHNICAL FIELD OF THE DISCLOSURE

The present disclosure is generally related to turbomachinery and, more specifically, to turbomachinery with high relative velocity created through counter-rotation of adjacent stages.

BACKGROUND OF THE DISCLOSURE

Performance requirements for gas turbine engines for commercial aircraft applications continue to be increased. The current trend in gas turbine engines is to have higher pressures and temperatures at the compressor outlet and higher rotational speeds of the compressor rotors within the engine. Because the compressor rotor speed is matched to the turbine rotor speed through an interconnecting shaft, these performance requirements also require higher rotational speeds for the turbine rotors. This trend has severely challenged the ability to provide structurally capable materials and cost effective designs that will meet these performance requirements.

Accordingly, it is desirable to improve the performance of any type of turbomachinery while limiting the required speed of the rotor portion of the turbomachine.

SUMMARY OF THE DISCLOSURE le;.5qIn one embodiment, a turbomachine is disclosed, comprising: at least one rotor stage operative to rotate about an axis in a first direction, each of the at least one rotor stage comprising a plurality of rotor blades; an outer ring case operative to rotate about the axis in a second direction opposite the first direction, the outer ring case including an inner surface; wherein the at least one rotor stage is at least partially disposed within the outer ring case; and at least one counter-rotating stage disposed on the inner surface of the outer ring case, each of the at least one counter-rotating stages comprising a plurality of airfoils disposed adjacent respective ones of the plurality of rotor blades.

In another embodiment, a gas turbine engine is disclosed, comprising: a compressor, a combustor and a first turbine in serial flow communication, wherein the compressor comprises: at least one rotor stage operative to rotate about an axis in a first direction, each of the at least one rotor stage comprising a plurality of rotor blades; an outer ring case operative to rotate about the axis in a second direction opposite the first direction, the outer ring case including an inner surface; wherein the at least one rotor stage is at least partially disposed within the outer ring case; and at least one counter-rotating stage disposed on the inner surface of the outer ring case, each of the at least one counter-rotating stages comprising a plurality of airfoils disposed adjacent respective ones of the plurality of rotor blades.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Figure 1:
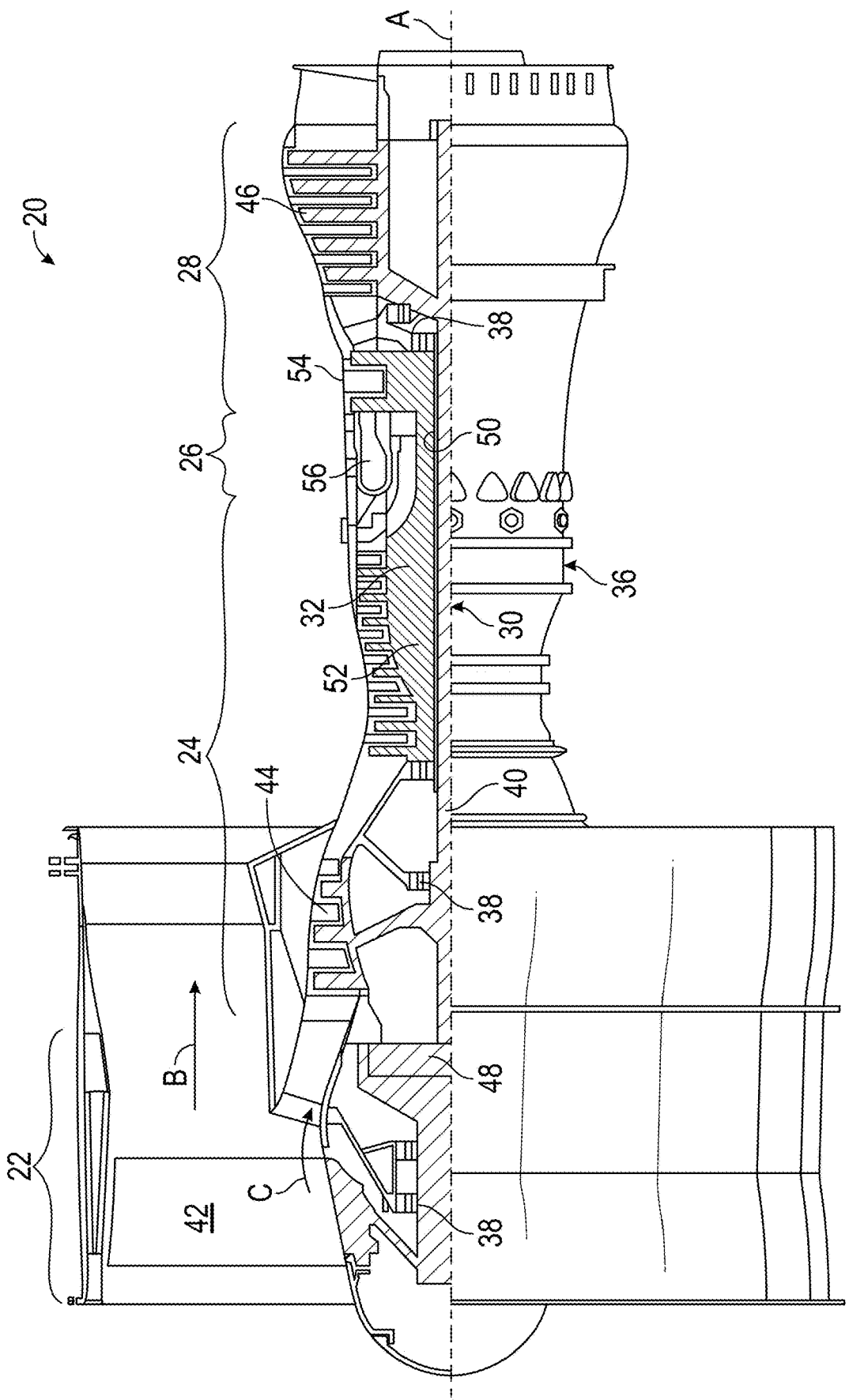
FIG. 1 is a schematic partial cross-sectional view of a gas turbine engine in an embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame of the engine static structure 36 is arranged generally between the high pressure turbine 54 and the low pressure turbine 46. The mid-turbine frame further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame includes airfoils which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2:
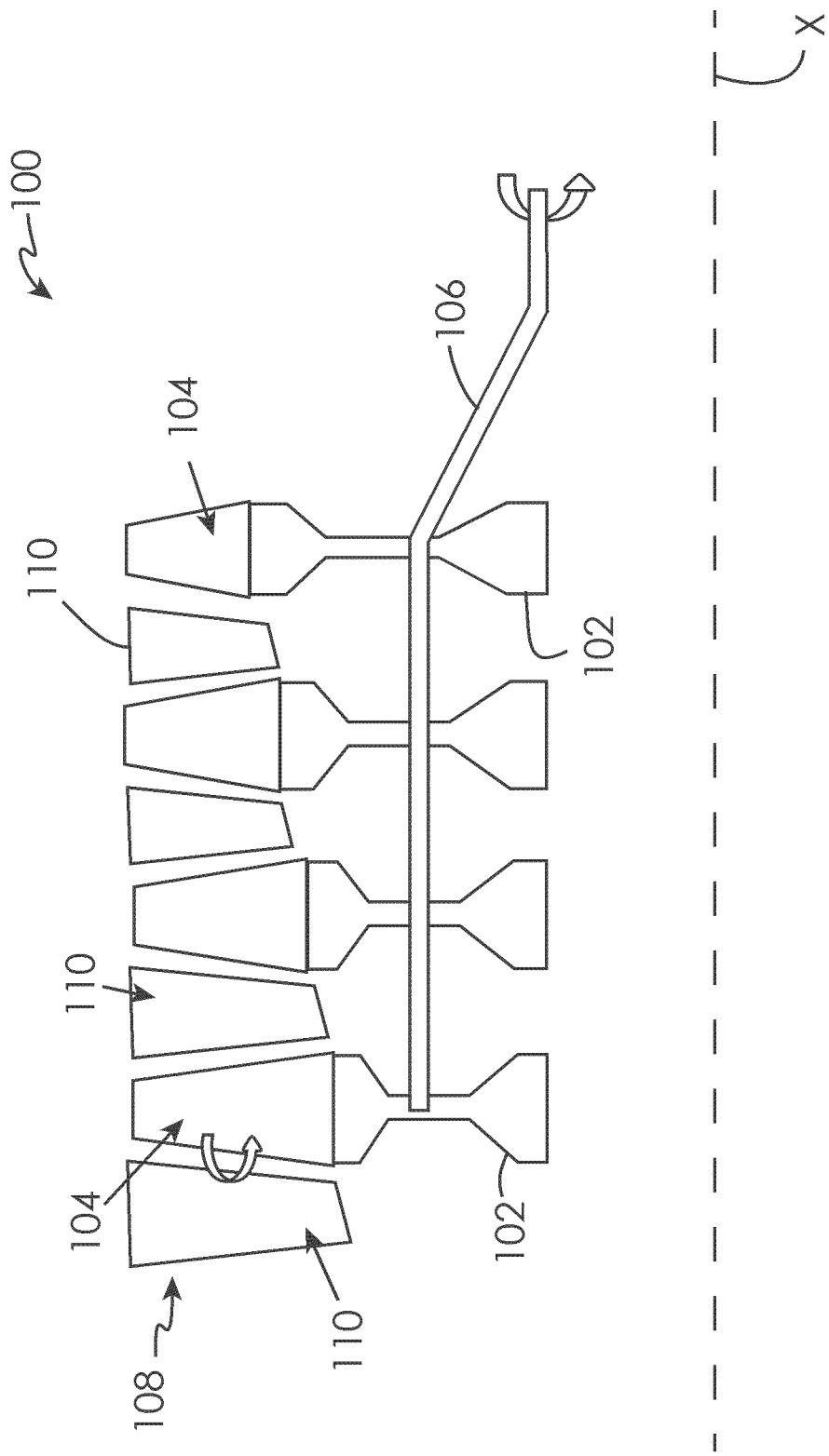
FIG. 2 is a schematic elevational view of a turbine compressor in an embodiment.

FIG. 2 schematically illustrates a compressor 100 of a gas turbine engine in an embodiment. A plurality of rotor stages 102 rotate about an engine axis X. Each rotor 102 carries a plurality of rotor blades 104. The rotors 102 are driven at a rotational speed N by means of a shaft 106 coupled to a turbine (not shown) within the engine. Adjacent to each rotor 102 is a stationary vane or stator 108 that is disposed circumferentially about the engine axis X but does not rotate. Each stator 108 comprises a plurality of stator vanes 110. The stator vanes 110 operate to direct the flow of core gas through the compressor 100 such that the rotor blades 104 may act upon the core gas flow with maximum efficiency.

The desired cycle efficiency of the engine system drives the requirement for the pressure ratio of the compressor. The pressure ratio in turn drives the core gas flowpath temperature and the temperature of the materials used to construct the rotor 102 and the stator 108. Design tradeoffs in compressor stage count, cost, efficiency and other factors determine the required rotor 102 velocity. When the rotor 102 velocity is required to be relatively high, which is the current trend, this increases the required drive rotor speed N of the attached turbine. Consequently, the design requirements for the rear stage of the compressor 100, in terms of stress handling, material selection, component life, etc., is a function of geometry, rotor 102 speed and temperature.

Figure 3:
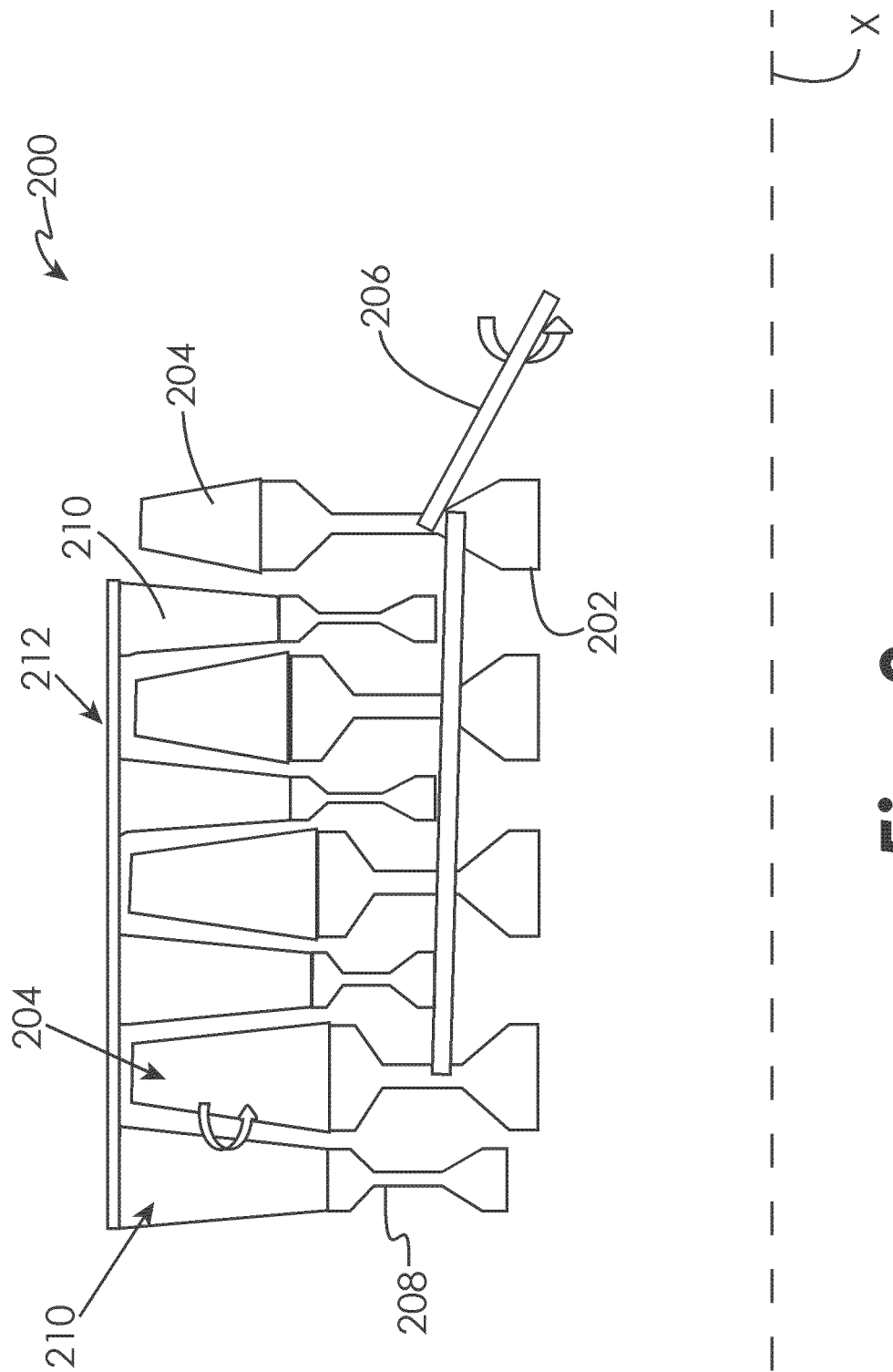
FIG. 3 is a schematic elevational view of a turbine compressor in an embodiment.

Referring now to FIG. 3, there is shown a compressor 200 of a gas turbine engine in an embodiment. A plurality of rotors 202 rotate about an engine axis X. Each rotor 202 carries a plurality of rotor blades 204. The rotors 202 are driven at a rotational speed N by means of a shaft 206 coupled to a turbine (not shown) within the engine. Adjacent to each rotor 202 is a counter-rotating stage 208 that also rotates about the engine axis X but in a direction opposite the direction of rotation of the rotors 202. Each counter-rotating stage 208 comprises a plurality of counter-rotating airfoils 210. The counter-rotating airfoils 210 are coupled to a rotating outer ring case 212 that rotates about the engine axis X at a speed of N* in a direction opposite the direction of rotation of the rotors 202. Therefore, the airfoils 210 also rotate about the engine axis X at a speed of N* in a direction opposite the direction of rotation of the rotors 202. In this arrangement, the relative velocity of the rotors 202 with respect to the counter-rotating airfoils 210 is $V_{rel}$=N+N*. Therefore, for any given desired $V_{rel}$ of the compressor 200, the required rotational speed of the rotors 202 is reduced by the speed N* of the counter-rotating stages 208. This reduction in required rotational speed of the rotors 202 results in a reduction in the design requirements of stress handling, material selection, component life, etc. for the rotors 202 with no reduction in the performance of the compressor 202.

Figure 4:
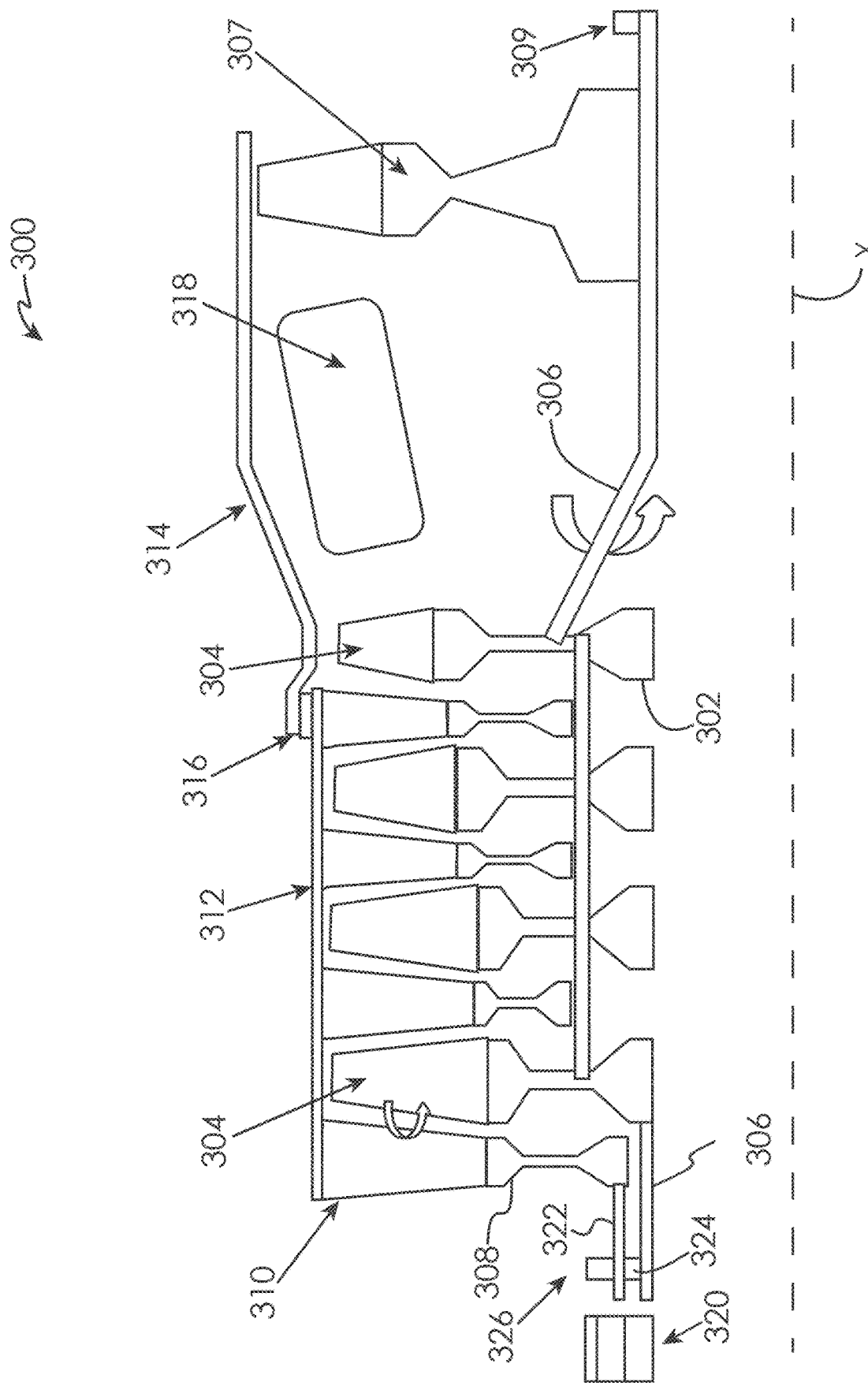
FIG. 4 is a schematic elevational view of a turbine compressor in an embodiment.

Referring now to FIG. 4, there is shown a single spool geared compressor 300 in an embodiment. A plurality of rotors 302 rotate about an engine axis X. Each rotor 302 carries a plurality of rotor blades 304. The rotors 302 are driven at a rotational speed N by means of a shaft 306 coupled to a turbine 307 within the engine. A single turbine stage 307 is illustrated, but the turbine may have a plurality of stages. The shaft 306 is supported within the turbine 307 by a bearing 309. Adjacent to each rotor 302 is a counter-rotating stage 308 that also rotates about the engine axis X but in a direction opposite the direction of rotation of the rotors 302. Each counter-rotating stage 308 comprises a plurality of counter-rotating airfoils 310. The counter-rotating airfoils 310 are coupled to a rotating outer ring case 312 that rotates about the engine axis X at a speed of N* in a direction opposite the direction of rotation of the rotors 302. The outer ring case 312 mates with a stationary outer case 314 of the engine. A combination seal/bearing 316 allows the stationary outer case 314 to support the rotating outer ring case 312 while at the same time preventing the compressed core gas from escaping the stationary outer case 314.

The compressed core gas is combusted in a combustor 318 and the expanded gases produced thereby cause the turbine 307 to rotate.

The shaft 306 is also coupled to a planetary gearbox 320 having a gear ratio $R_g$. An output shaft 322 of the gearbox 320 is coupled to the counter-rotating airfoils 310/outer ring case 312 to cause rotation thereof. The shaft 306 is supported by a bearing 324 near the gearbox 320, while the shaft 322 is supported by a bearing 326.

Therefore, the airfoils 310 rotate about the engine axis X at a speed of $N^*=N\times R_g$ in a direction opposite the direction of rotation of the rotors 302. In different embodiments, $R_g$ may be >1 or <1. In this arrangement, the relative velocity of the rotors 302 with respect to the counter-rotating stages 308 is $V_{rel}=N+N^*$. Therefore, for any given desired $V_{rel}$ of the compressor 300, the required rotational speed of the rotors 302 is reduced by the speed $N^*$ of the counter-rotating stages 308, and the required speed of the turbine 307 may be further reduced when $R_g>1$.

Figure 5:
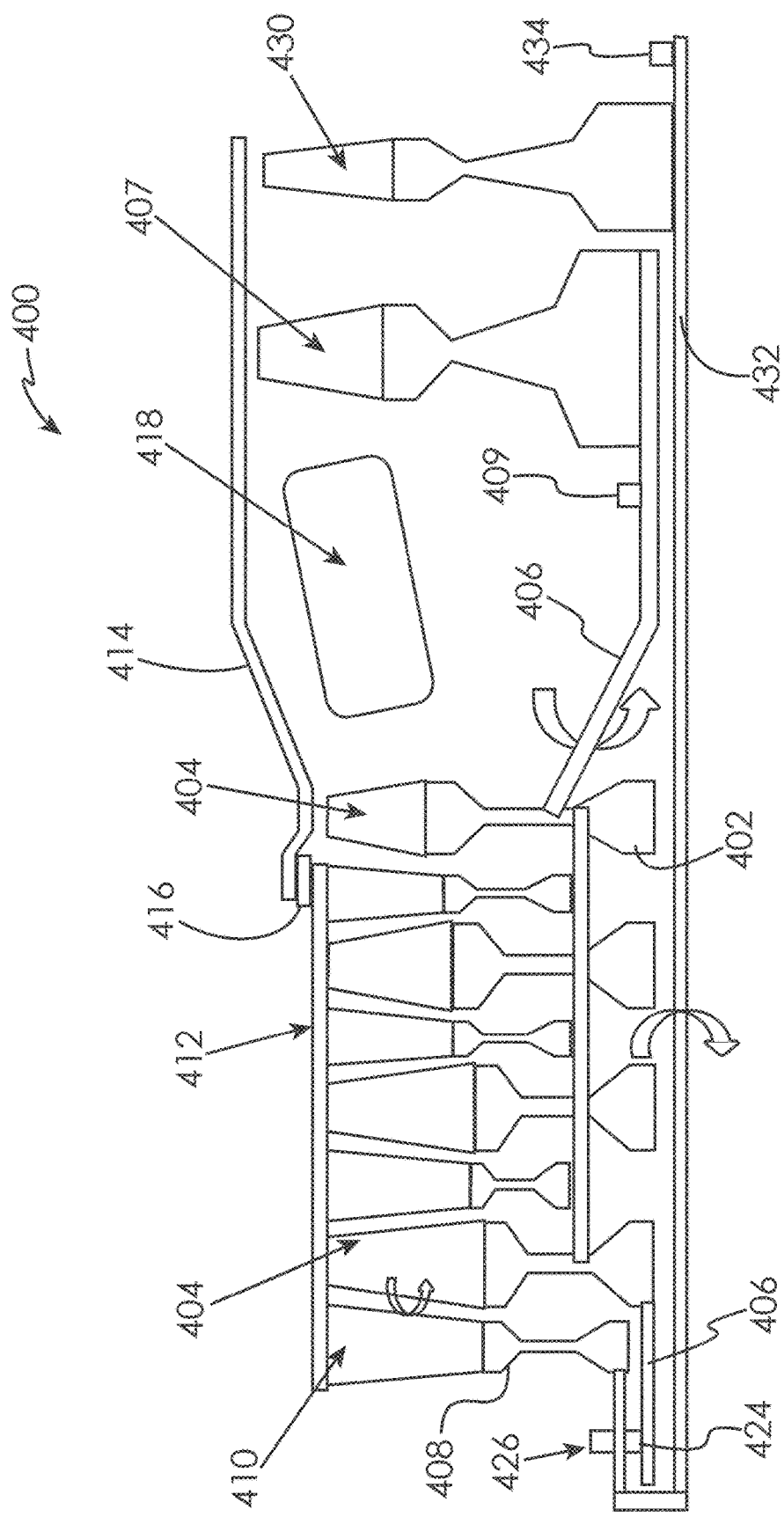
FIG. 5 is a schematic elevational view of a turbine compressor in an embodiment.

Referring now to FIG. 5, there is shown a multi-spool direct drive compressor 400 in an embodiment. A plurality of rotors 402 rotate about an engine axis X. Each rotor 402 carries a plurality of rotor blades 404. The rotors 402 are driven at a rotational speed $N_x$ by means of a shaft 406 coupled to a high pressure turbine 407 within the engine. A single high pressure turbine stage 407 is illustrated, but the high pressure turbine may have a plurality of stages. The shaft 406 is supported within the high pressure turbine 407 by a bearing 409. Adjacent to each rotor 402 is a counter-rotating stage 408 that also rotates about the engine axis X but in a direction opposite the direction of rotation of the rotors 402. Each counter-rotating stage 408 comprises a plurality of counter-rotating airfoils 410. The counter-rotating airfoils 410 are coupled to a rotating outer ring case 412 that rotates about the engine axis X at a speed of $N_y$ in a direction opposite the direction of rotation of the rotors 402. The outer ring case 412 mates with a stationary outer case 414 of the engine. A combination seal/bearing 416 allows the stationary outer case 414 to support the rotating outer ring case 412 while at the same time preventing the compressed core gas from escaping the stationary outer case 414. The compressed core gas is combusted in a combustor 418 and the expanded gases produced thereby cause the high pressure turbine 407 to rotate.

The gases exiting the high pressure turbine cause an intermediate pressure, low pressure, or other turbine stage, collectively indicated at 430, to rotate. A single turbine stage 430 is illustrated, but the turbine 430 may have a plurality of stages. The counter-rotating stages 408 are driven at a rotational speed $N_y$ by means of a shaft 432 coupled to the turbine 430. The shaft 432 is supported within the turbine 430 by a bearing 434. The shaft 432 is coupled to the counter-rotating stages 408 in a direct drive arrangement. The shaft 406 is supported by a bearing 424 at the front end of the compressor 400, while the shaft 432 is supported by a bearing 426.

In this arrangement, the relative velocity of the rotors 402 with respect to the counter-rotating stages 408 is $V_{rel}=N_x+N_y$. Therefore, for any given desired $V_{rel}$ of the compressor 400, the required rotational speed of the rotors 402 is reduced by the speed $N_y$ of the counter-rotating stages 408, and the required speed of the turbine 407 is therefore reduced compared to a compressor with stators adjacent the rotors.

Figure 6:
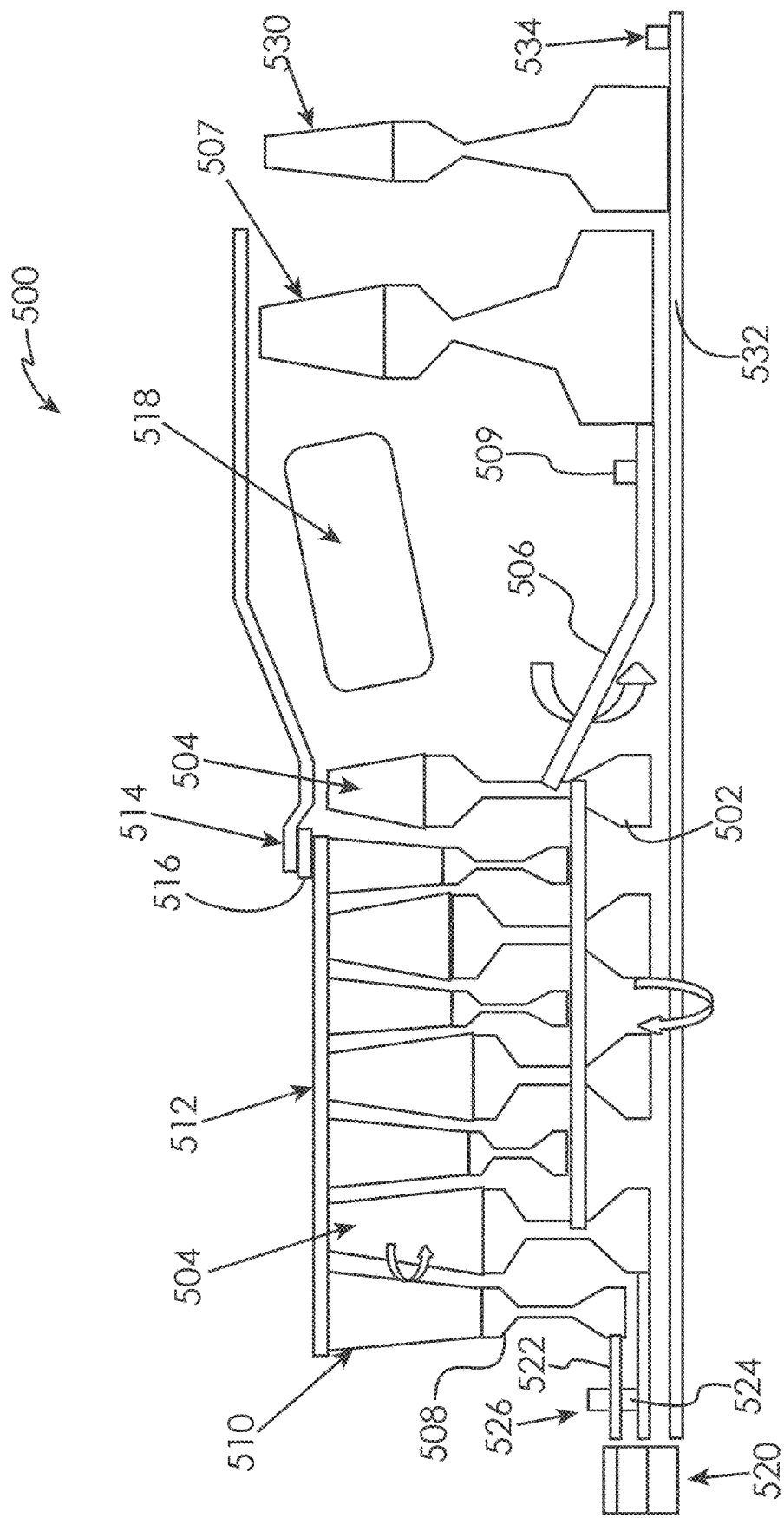
FIG. 6 is a schematic elevational view of a turbine compressor in an embodiment.

Referring now to FIG. 6, there is shown a multi-spool geared compressor 500 in an embodiment. A plurality of rotors 502 rotate about an engine axis X. Each rotor 502 carries a plurality of rotor blades 504. The rotors 502 are driven at a rotational speed $N_x$ by means of a shaft 506 coupled to a high pressure turbine 507 within the engine. A single high pressure turbine stage 507 is illustrated, but the high pressure turbine may have a plurality of stages. The shaft 506 is supported within the high pressure turbine 507 by a bearing 509. Adjacent to each rotor 502 is a counter-rotating stage 508 that also rotates about the engine axis X but in a direction opposite the direction of rotation of the rotors 502. Each counter-rotating stage 508 comprises a plurality of counter-rotating airfoils 510. The counter-rotating airfoils 510 are coupled to a rotating outer ring case 512 that rotates about the engine axis X at a speed of $N^*$ in a direction opposite the direction of rotation of the rotors 502. The outer ring case 512 mates with a stationary outer case 514 of the engine. A combination seal/bearing 516 allows the stationary outer case 514 to support the rotating outer ring case 512 while at the same time preventing the compressed core gas from escaping the stationary outer case 514. The compressed core gas is combusted in a combustor 518 and the expanded gases produced thereby cause the high pressure turbine 507 to rotate.

The gases exiting the high pressure turbine cause an intermediate pressure, low pressure, or other turbine stage, collectively indicated at 530, to rotate at a rotational speed $N_y$. A single turbine stage 530 is illustrated, but the turbine 530 may have a plurality of stages. The counter-rotating stages 508 are driven by means of a shaft 532 coupled to the turbine 530. The shaft 532 is supported within the turbine 530 by a bearing 534. The shaft 532 is coupled to the counter-rotating stages 508 by a planetary gearbox 520 having a gear ratio $R_g$. The shaft 506 is supported by a bearing 524 at the front end of the compressor 500, while the shaft 532 is supported by a bearing 526. An output shaft 522 of the gearbox 520 is coupled to the counter-rotating airfoils 510/outer ring case 512 to cause rotation thereof.

Therefore, the airfoils 510 rotate about the engine axis X at a speed of $N^*=N_y \times R_g$ in a direction opposite the direction of rotation of the rotors 502. In different embodiments, $R_g$ may be >1 or <1. In this arrangement, the relative velocity of the rotors 502 with respect to the counter-rotating stages 508 is $V_{rel}=N_x+N^*$. Therefore, for any given desired $V_{rel}$ of the compressor 500, the required rotational speed of the rotors 502 is reduced by the speed $N^*$ of the counter-rotating stages 508, and the required speed of the turbine 507 may be further reduced when $R_g>1$.

It will be appreciated that the embodiments disclosed herein allow a significant reduction in the required rotational velocities of both the compressor and turbine components while still providing the compressor with a high relative velocity. This allows the compressor pressure ratio to increase and the TSFC of the engine to decrease while maintaining designs within the structural limitations of available materials, including available stress capability at elevated operating temperatures. Reducing the rotor velocity will also enhance rotor life expectancy and result in a possible weight reduction stemming from lessened design requirements due to the lower component stresses resulting from the decreased velocities. Use of counter-rotating components may also allow for a lower number of compressor stages, thereby shortening the axial length of the engine. Additionally, a desired level of relative velocity may be delivered with the flowpath disposed at a lower radial elevation, which may benefit engine packaging, including providing for exhausting bypass flow. The rotor may rotate at a rotational velocity higher than, the same as, or lower than the rotational velocity of the counter-rotating airfoils.

Although the concepts disclosed herein are illustrated as applied to a compressor within a gas turbine engine, such disclosure is exemplary only. The presently disclosed embodiments may be applied to any form of turbomachinery, including turbines within a gas turbine engine to name just one non-limiting example.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed:

1. A gas turbine engine, comprising:
a compressor, a combustor and a first turbine in serial flow communication, wherein the compressor comprises:
at least one rotor stage operative to rotate about an axis in a first direction, each of the at least one rotor stage comprising a plurality of rotor blades;
a first shaft operatively coupling the first turbine and the at least one rotor stage;
an outer ring case operative to rotate about the axis in a second direction opposite the first direction, the outer ring case including an inner surface, wherein the at least one rotor stage is at least partially disposed within the outer ring case;
at least one counter-rotating stage disposed on the inner surface of the outer ring case, each of the at least one counter-rotating stages comprising a plurality of airfoils disposed adjacent respective ones of the plurality of rotor blades;
a planetary gearbox including a gearbox output shaft for rotating to the outer ring case;
wherein the first shaft drives the gearbox output shaft via the planetary gearbox and wherein the planetary gearbox output shaft is driven at a different rate than the first shaft;
a stationary case mated with the outer ring case, the stationary case surrounding the combustor and radially outward of the outer ring case; and
a combination seal/bearing disposed between the stationary case and the outer ring case.

2. The gas turbine engine of claim 1, wherein:
the at least one rotor stage comprises a plurality of rotor stages; and
the at least one counter-rotating stage comprises a plurality of counter-rotating stages.

3. The gas turbine engine of claim 1, further comprising:
a second turbine;
a second shaft operatively coupling the second turbine and the at least one counter-rotating stage.

4. The gas turbine engine of claim 3, wherein:
the first turbine comprises a plurality of first turbine stages; and
the second turbine comprises a plurality of second turbine stages.

* * * * *